(12) United States Patent
Luo et al.

(10) Patent No.: US 12,044,876 B2
(45) Date of Patent: Jul. 23, 2024

(54) BACKLIGHT MODULE AND RELATED LIGHT EMITTING ELECTRONIC DEVICE

(71) Applicant: Wistron Corporation, New Taipei (TW)

(72) Inventors: Bin Luo, New Taipei (TW); RuiHua Wang, New Taipei (TW); Chih-Chou Chou, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 18/133,528

(22) Filed: Apr. 12, 2023

(65) Prior Publication Data

US 2024/0192426 A1 Jun. 13, 2024

(30) Foreign Application Priority Data

Dec. 13, 2022 (CN) .......................... 202211594094.0

(51) Int. Cl.
*F21V 8/00* (2006.01)
*G06F 1/16* (2006.01)

(52) U.S. Cl.
CPC .......... *G02B 6/0031* (2013.01); *G02B 6/0066* (2013.01); *G02B 6/0088* (2013.01); *G06F 1/1607* (2013.01)

(58) Field of Classification Search
CPC .. G02B 6/0031; G02B 6/0066; G02B 6/0088; G06F 1/1607
See application file for complete search history.

(56) References Cited

U.S. PATENT DOCUMENTS

| 8,681,290 B1* | 3/2014 | Hufnagel | G02B 6/0026 |
| | | | 362/621 |
| 2008/0225203 A1* | 9/2008 | Kim | G02B 6/0031 |
| | | | 362/613 |
| 2010/0134722 A1* | 6/2010 | Huang | G02F 1/133308 |
| | | | 349/65 |

(Continued)

FOREIGN PATENT DOCUMENTS

| KR | 101245086 B1 * | 6/2006 | |
| KR | 2012005659 A * | 1/2012 | ........... G02B 6/0031 |

(Continued)

*Primary Examiner* — Mary Ellen Bowman
(74) *Attorney, Agent, or Firm* — Winston Hsu (57) ABSTRACT

A backlight module is provided and includes a circuit board, a light emitting component disposed on the circuit board, a light guiding component, a first light reflecting component and a second light reflecting component. The first light reflecting component covers at least a portion of a first surface of the light guiding component adjacent to the circuit board. The second light reflecting component includes a first light reflecting portion and a second light reflecting portion. The first light reflecting portion extends along a first direction and covers at least a portion of a second surface of the light guiding component away from the circuit board. The second light reflecting portion is connected to the first light reflecting portion and extends along a second direction. The second reflecting portion is located corresponding to a third surface of the light guiding component. Besides, a related light emitting electronic device is provided.

20 Claims, 10 Drawing Sheets

(56) References Cited

U.S. PATENT DOCUMENTS

| | | | |
|---|---|---|---|
| 2012/0075883 A1* | 3/2012 | Chen | G02B 6/002 |
| | | | 362/606 |
| 2015/0124479 A1* | 5/2015 | Jung | F21V 7/10 |
| | | | 362/310 |
| 2015/0153505 A1* | 6/2015 | Chang | G02B 6/0031 |
| | | | 362/613 |
| 2016/0161666 A1* | 6/2016 | Sun | G02B 6/0031 |
| | | | 362/607 |

FOREIGN PATENT DOCUMENTS

| | | | |
|---|---|---|---|
| KR | 20130058935 A | * | 6/2013 |
| TW | 202030440 A | | 8/2020 |

\* cited by examiner

BACKLIGHT MODULE AND RELATED LIGHT EMITTING ELECTRONIC DEVICE

BACKGROUND OF THE INVENTION

1. Field of the Invention

The present invention relates to a backlight module and related a light emitting electronic device, and more specifically, to a backlight module with a thin thickness, and a related light emitting electronic device.

2. Description of the Prior Art

A thin and lightweight design has become a development trend of electronic devices. Taking a laptop computer as an example, it strives to reduce a thickness of the laptop computer for achieving a thin and lightweight configuration, so as to meet requirements of aesthetics and portability. However, when the laptop computer is provided with a luminous keyboard or luminous patterns, the thickness of the laptop computer cannot be reduced significantly due to a backlight module.

SUMMARY OF THE INVENTION

Therefore, it is an objective of the present invention to provide a backlight module with a thin thickness, and a related light emitting electronic device for solving the aforementioned problems.

In order to achieve the aforementioned objective, the present invention discloses a backlight module. The backlight module includes a circuit board, a light emitting component, a light guiding component, a first light reflecting component and a second light reflecting component. The light emitting component is disposed on the circuit board. The light guiding component has a first surface, a second surface and a third surface. The second surface is farther away from the circuit board than the first surface. The first light reflecting component covers at least a portion of the first surface of the light guiding component. The second light reflecting component includes a first light reflecting portion and a second light reflecting portion. The first light reflecting portion extends along a first direction. The first light reflecting portion covers at least a portion of the second surface of the light guiding component. The second light reflecting portion is connected to the first light reflecting portion. The second light reflecting portion extends along a second direction different from the first direction. The second light reflecting portion is located corresponding to the third surface of the light guiding component.

According to an embodiment of the present invention, the second light reflecting component further includes a third light reflecting portion connected to the second light reflecting portion, and the third light reflecting portion extends along the first direction.

According to an embodiment of the present invention, the third light reflecting portion is located between the first light reflecting component and the circuit board, or the third light reflecting portion is located at a side of the circuit board away from the first light reflecting component.

According to an embodiment of the present invention, a first opening is formed on the first light reflecting component, and the first opening is located corresponding to the light emitting component.

According to an embodiment of the present invention, a second opening is formed on the light guiding component, and the second opening is located corresponding to the light emitting component.

According to an embodiment of the present invention, the first light reflecting portion covers the second opening.

According to an embodiment of the present invention, the backlight module further includes a combining component located between the first light reflecting component and the circuit board, a third opening is formed on the combining component, and the third opening is located corresponding to the light emitting component.

According to an embodiment of the present invention, the first light reflecting portion covers the second opening.

According to an embodiment of the present invention, the backlight module further includes a combining component located between the first light reflecting component and the circuit board, a third opening is formed on the combining component, and the third opening is located corresponding to the light emitting component.

According to an embodiment of the present invention, the backlight module further includes a light transmissible component disposed on the light guiding component.

According to an embodiment of the present invention, an aperture is formed on the first light reflecting portion, and the aperture is located corresponding to the light transmissible component.

According to an embodiment of the present invention, the light transmissible component is not aligned with the light emitting component along the second direction.

According to an embodiment of the present invention, the backlight module further includes a light reflecting layer formed on a surface of the circuit board, and the light emitting component is disposed on the surface of the circuit board.

According to an embodiment of the present invention, the second light reflecting portion is located corresponding to the third surface of the light guiding component and a surface of the first light reflecting component.

In order to achieve the aforementioned objective, the present invention further discloses a light emitting electronic device. The light emitting electronic device includes a casing and a backlight module The backlight module is disposed on the casing. The backlight module includes a circuit board, a light emitting component, a light guiding component, a first light reflecting component and a second light reflecting component. The light emitting component is disposed on the circuit board. The light guiding component has a first surface, a second surface and a third surface. The second surface is farther away from the circuit board than the first surface. The first light reflecting component covers at least a portion of the first surface of the light guiding component. The second light reflecting component includes a first light reflecting portion and a second light reflecting portion. The first light reflecting portion extends along a first direction. The first light reflecting portion covers at least a portion of the second surface of the light guiding component. The second light reflecting portion is connected to the first light reflecting portion. The second light reflecting portion extends along a second direction different from the first direction. The second light reflecting portion is located corresponding to the third surface of the light guiding component.

According to an embodiment of the present invention, the light emitting electronic device is a laptop computer, and the casing is a top cover of the laptop computer.

According to an embodiment of the present invention, the second light reflecting component further includes a third light reflecting portion connected to the second light reflecting portion, the third light reflecting portion extends along the first direction. The third light reflecting portion is located between the first light reflecting component and the circuit board, or the third light reflecting portion is located at a side of the circuit board away from the first light reflecting component.

In summary, the present invention does not require any additional bracket for mounting the light emitting component, so that the present invention has a significantly reduced thickness. Besides, the present invention can effectively increase a light density of the light guiding component. Therefore, the present invention has advantages of not only thin structure but also improved luminance.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct mechanical connection. Thus, if a first device is coupled to a second device, that connection may be through a direct mechanical connection, or through an indirect mechanical connection via other devices and connections.

Figure 1:
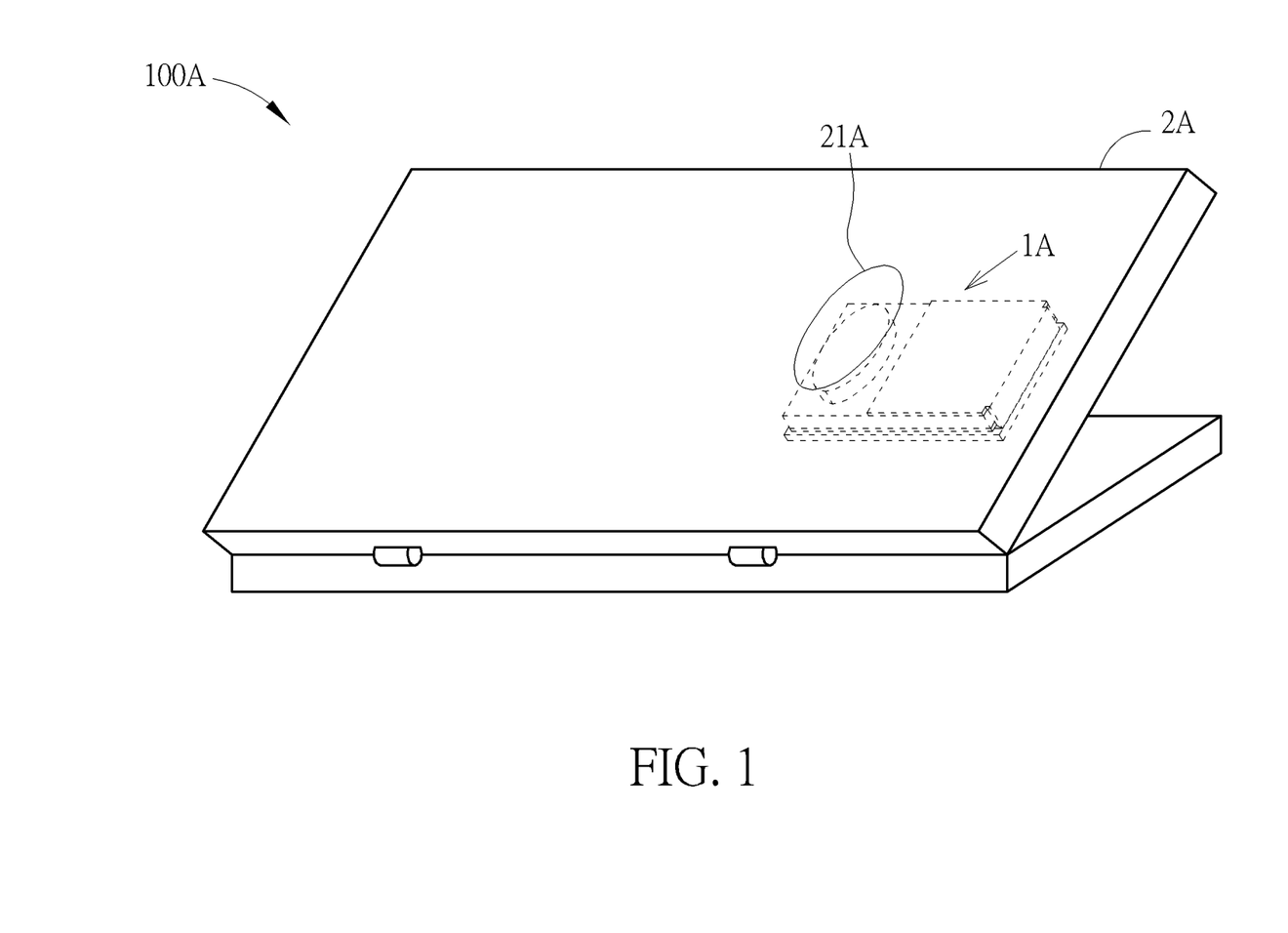
FIG. 1 is a diagram of a light emitting electronic device according to a first embodiment of the present invention.
Figure 2:
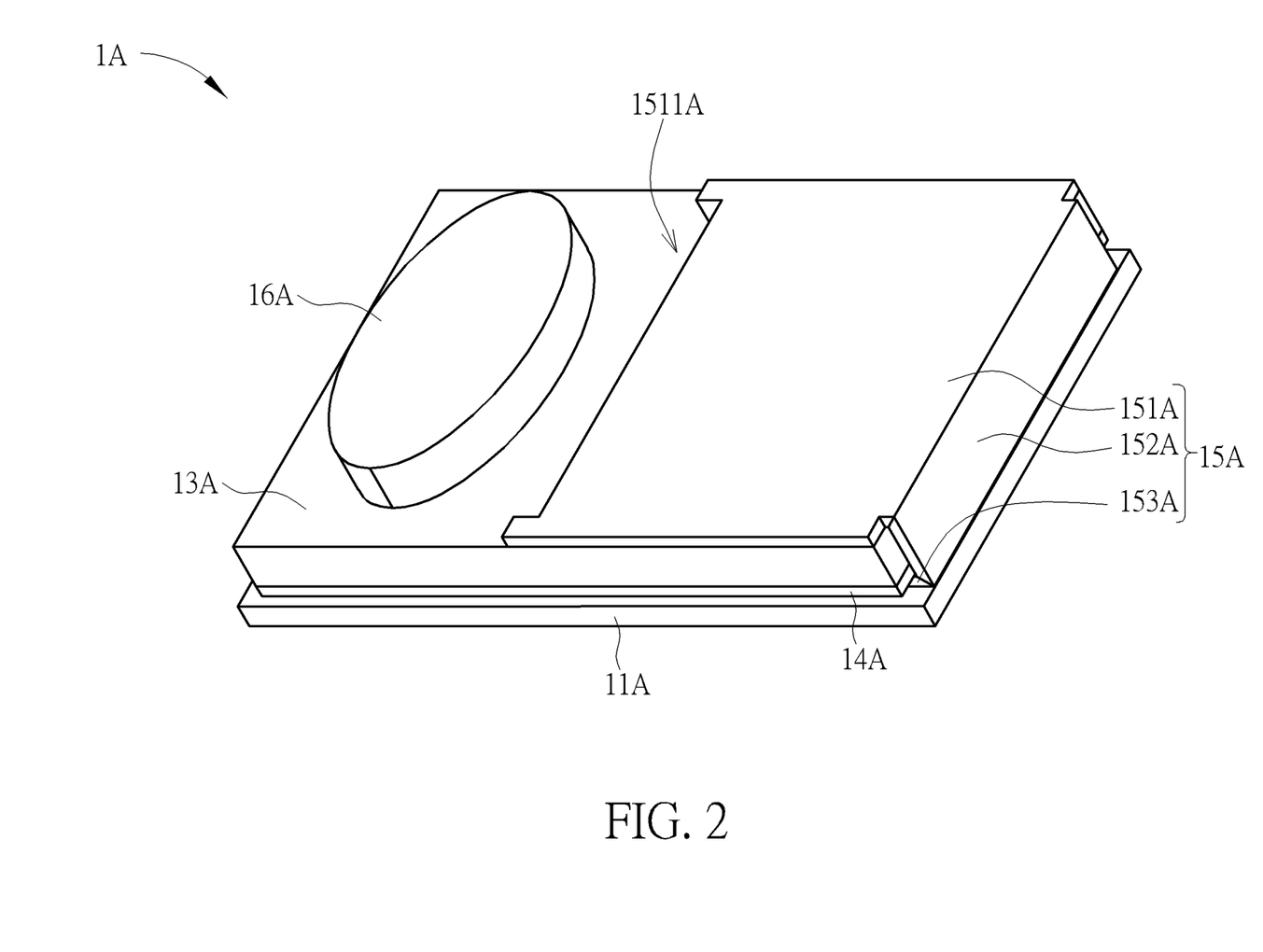
FIG. 2 is a partial diagram of a backlight module according to the first embodiment of the present invention.
Figure 3:
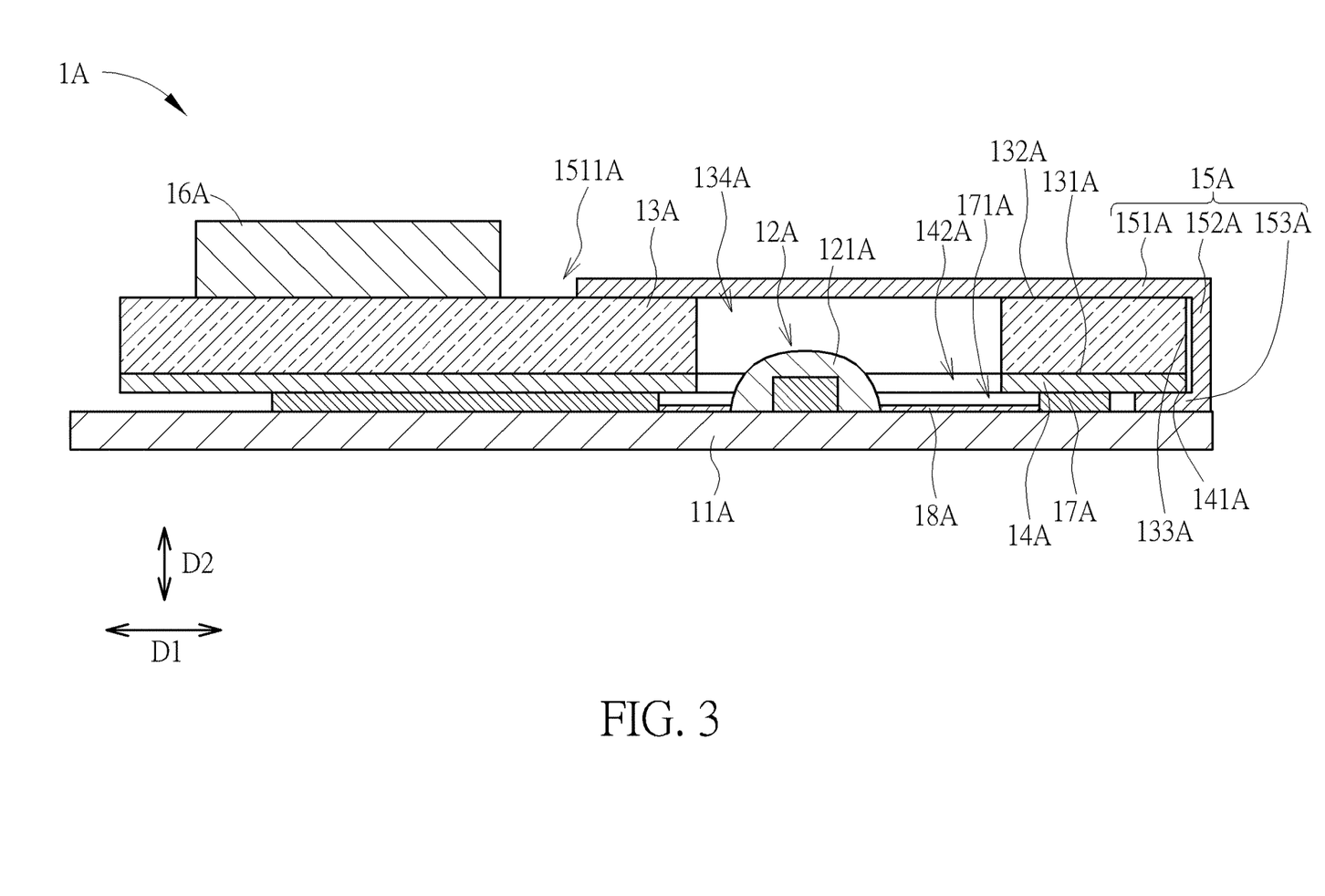
FIG. 3 is a partial sectional diagram of the backlight module according to the first embodiment of the present invention.
Figure 4:
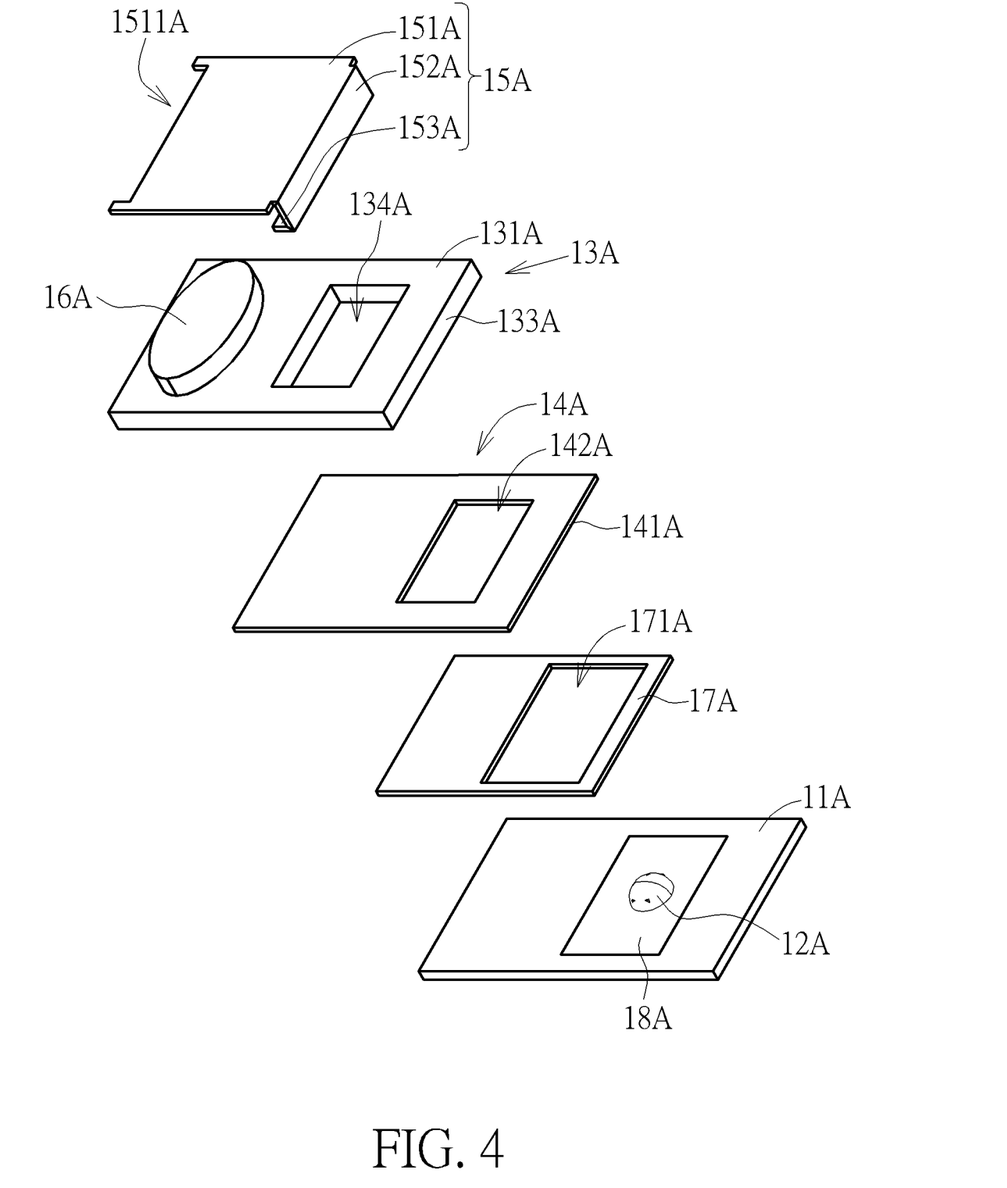
FIG. 4 and FIG. 5 are partial exploded diagrams of the backlight module at different views according to the first embodiment of the present invention.
Figure 5:
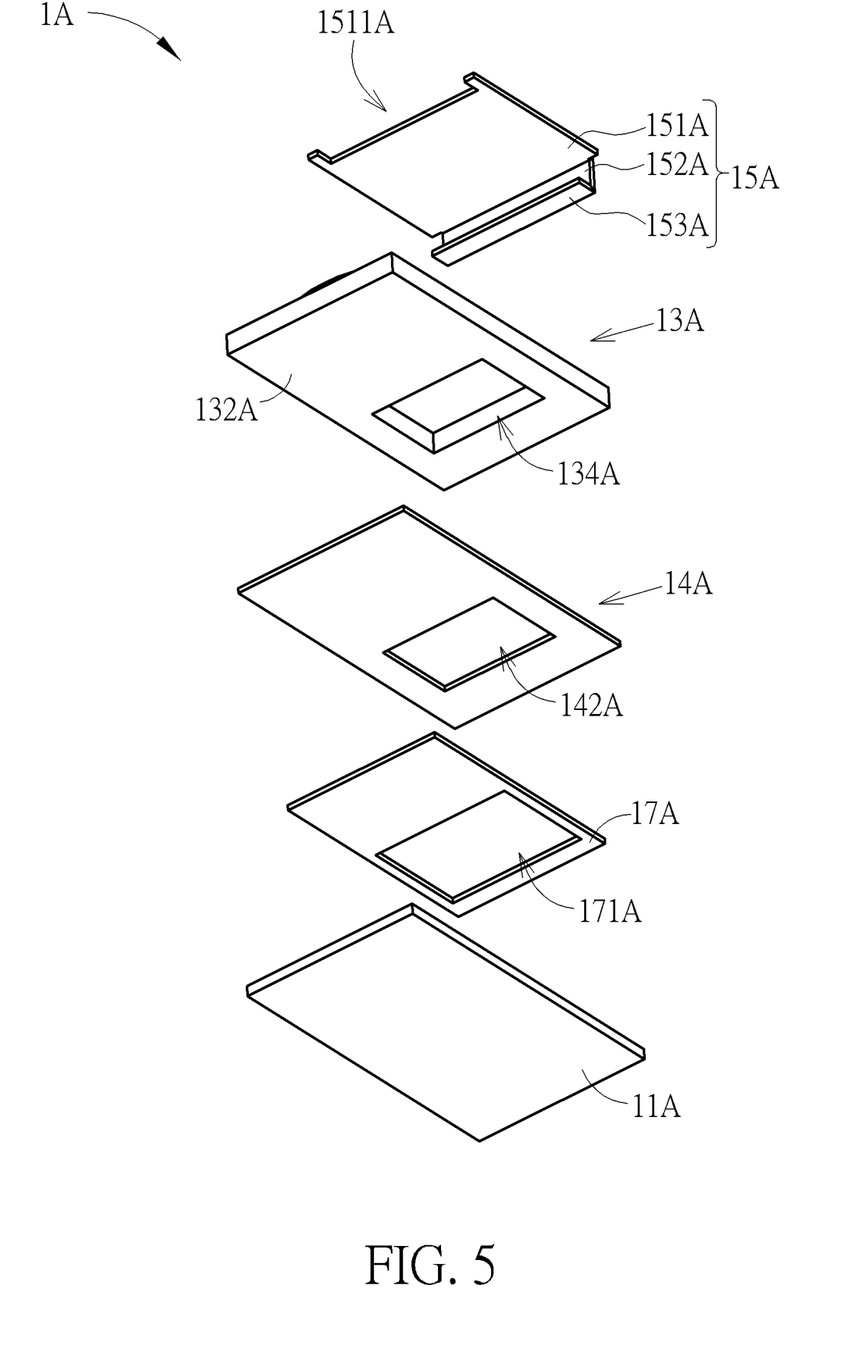

Please refer to FIG. 1 to FIG. 5. FIG. 1 is a diagram of a light emitting electronic device 100A according to a first embodiment of the present invention. FIG. 2 is a partial diagram of a backlight module 1A according to the first embodiment of the present invention. FIG. 3 is a partial sectional diagram of the backlight module 1A according to the first embodiment of the present invention. FIG. 4 and FIG. 5 are partial exploded diagrams of the backlight module 1A at different views according to the first embodiment of the present invention. As shown in FIG. 1, the light emitting electronic device 100A includes the backlight module 1A and a casing 2A. The backlight module 1A can be a thin backlight module with a thin thickness. The backlight module 1A can be disposed on the casing 2A for lighting up a pattern 21A on the casing 2A. In this embodiment, the light emitting electronic device 100A can be a laptop computer. The casing 2A can be a top cover of a display of the laptop computer. The pattern 21A can be a brand logo pattern. However, the present invention is not limited to this embodiment.

As shown in FIG. 2 to FIG. 5, the backlight module 1A includes a circuit board 11A, a light emitting component 12A, a light guiding component 13A, a first light reflecting component 14A and a second light reflecting component 15A. The light emitting component 12A is disposed on the circuit board 11A. The light guiding component 13A is for guiding light emitted from the light emitting component 12A. The light guiding component 13A has a first surface 131A, a second surface 132A and a third surface 133A. The first surface 131A and the second surface 132A are opposite to each other. The third surface 133A is adjacent and perpendicular to the first surface 131A and the second surface 132A. The second surface 132A is farther away from the circuit board 11A than the first surface 131A. The first light reflecting component 14A and the second light reflecting component 15A are configured to reflect light for increasing a light density of the light guiding component 13A. The first light reflecting component 14A at least partially covers the first surface 131A of the light guiding component 13A, i.e., the first light reflecting component 14A covers at least a portion of the first surface 131A of the light guiding component 13A. The first light reflecting component 14A has a surface 141A adjacent and parallel to the third surface 133A of the light guiding component 13A. The second light reflecting component 15A has a first light reflecting portion 151A and a second light reflecting portion 152A. The first light reflecting portion 151A extends along a first direction D1. The first light reflecting portion 151A at least partially covers the second surface 132A of the light guiding component 13A, i.e., the first light reflecting portion 151A covers at least a portion of the second surface 132A of the light guiding component 13A. The second light reflecting portion 152A is connected to the first light reflecting portion 151A and extends along a second direction D2 different from the first direction D1. The second light reflecting portion 152A is located corresponding to the third surface 133A of the light guiding component 13A and the surface 141A of the first light reflecting component 14A.

In this embodiment, the third surface 133A of the light guiding component 13A and the surface 141A of the first light reflecting component 14A can be coplanar. The second light reflecting portion 152A can be located corresponding to the third surface 133A of the light guiding component 13A and the surface 141A of the first light reflecting component 14A, and there can be a gap between the second light reflecting portion 152A and the third surface 133A of the light guiding component 13A and a gap between the second light reflecting portion 152A and the surface 141A of the first light reflecting component 14A. That is, in this embodiment, the second light reflecting portion 152A can conceal the third surface 133A of the light guiding component 13A and the surface 141A of the first light reflecting component 14A. However, the present invention is not limited to this embodiment. For example, in another embodiment, the surface of the first light reflecting component and the third surface of the light guiding component can be parallel to each other but not coplanar. The second light reflecting portion can be located corresponding to the third surface of the light guiding component only, and there can be no gap between the second light reflecting portion and the third surface of the light guiding component, i.e., the second light reflecting portion can only cover the third surface of the light guiding component in an abutting manner, but does not cover or conceal the surface of the first light reflecting component. Alternatively, in another embodiment, the surface of the first light reflecting component and the third surface of the light guiding component can be coplanar. The second light reflecting portion can be located corresponding to the third surface of the light guiding component and the surface of the first light reflecting component, and there can be no gap between the second light reflecting portion and the third surface of the light guiding component and no gap between the second light reflecting portion and the surface of the first light reflecting component, i.e., the second light reflecting portion can cover the third surface of the light guiding component and the surface of the first light reflecting component in an abutting manner.

Specifically, the light emitting component 12A can have a mini light emitting diode or a micro light emitting diode and further have a protecting layer 121A made of silicone or epoxy material. The protecting layer 121A is for fixing and covering the light emitting diode to prevent moisture or water from approaching the light emitting diode. The circuit board 11A can be a flexible printed circuit board having an insulation layer and a conductive layer attached to, e.g., adhered to, the insulation layer. For example, the first light reflecting component 14A and/or the second light reflecting component 15A can be combined with a corresponding component by adhesive. However, the present invention is not limited to this embodiment.

As shown in FIG. 2 to FIG. 5, the backlight module 1A further includes a light transmissible component 16A disposed on the light guiding component 13A and located corresponding to the pattern 21A. The light transmissible component 16A is not aligned with the light emitting component 12A along the second direction D2. An aperture 1511A is formed on the first light reflecting portion 151A and located corresponding to the light transmissible component 16A. The light entering into the light guiding component 13A can travel toward the casing 2A through the light transmissible component 16A revealed from the aperture 1511A for lighting up the pattern 21A.

In this embodiment, the pattern 21 can be formed from a light transmissible portion and a light blocking portion on the casing 2A, and the light transmissible portion and the light blocking portion can be formed by engraving. Understandably, in another embodiment, the light transmissible component can be exposed out of the casing, and there can be an ink layer printed on the light transmissible component to form the pattern on the light transmissible component. Alternatively, in another embodiment, the aperture can be formed on the first light reflecting portion for revealing a portion of the light guiding component, and the light transmissible component can be omitted.

In order to make the structure of the backlight module 1A compact, the second light reflecting component 15A further a third light reflecting portion 153A connected to the second light reflecting portion 152A and extending along the first direction D1. The third light reflecting portion 153A is located between the first light reflecting component 14A and the circuit board 11A. The backlight module 1A further includes a combining component 17A located between the first light reflecting component 14A and the circuit board 11A.

Specifically, the combining component 17A can be a double-sided adhesive tape to adhere the first light reflecting component 14A to the circuit board 11A. However, the present invention is not limited to this embodiment.

Understandably, in another embodiment, the combining component can be omitted. Alternatively, in another embodiment, the third light reflecting portion can be omitted or be located at a side of the circuit board away from the first light reflecting component.

Besides, a first opening 142A is formed on the first light reflecting component 14A. A second opening 134A is formed on the light guiding component 13A. A third opening 171A is formed on the combining component 17A. The first opening 142A, the second opening 134A and the third opening 171A are located corresponding to the light emitting component 12A for forming an accommodating area or an accommodating space for accommodating the light emitting component 12A. The first light reflecting portion 151A covers the second opening 134A.

In order to increase the light density of the light guiding component 13A by reflecting light emitted toward the circuit board 11A, the backlight module 1A further includes a light reflecting layer 18A formed on a surface of the circuit board 11A whereon the light emitting component 12a is disposed.

Specifically, the light reflecting layer 18A can be a white ink layer printed on the surface of the circuit board 11A or a white protecting film attached to, e.g., adhered to, the surface of the circuit board 11A. However, the present invention is not limited to this embodiment.

Understandably, the light reflecting layer can be utilized or omitted according to practical demands. For example, in another embodiment, the light reflecting layer can be omitted.

Furthermore, it should be noticed that in this embodiment, as shown in FIG. 1 to FIG. 5, the first light reflecting portion 151A of the second light reflecting component 15A is located at a side of the light transmissible component 16A. The second light reflecting portion 152A of the second light reflecting component 15A connected to the first light reflecting portion 151A of the second light reflecting component 15A is located corresponding to the third surface 133A of the light guiding component 13A. However, the present invention is not limited to this embodiment. For example, in another embodiment, the first light reflecting portion can surround the light transmissible component, and the second light reflecting portion connected to the first light reflecting portion can surround the light guiding component, i.e., the second light reflecting portion can be located corresponding to not only the third surface of the light guiding component but also a fourth surface of the light guiding component opposite to the third surface of the light guiding component, a fifth surface of the light guiding component adjacent to the first surface, the second surface, the third surface and the fourth surface of the light guiding component, and a sixth surface of the light guiding component opposite to the fifth surface of the light guiding component, so as to conceal or cover the third surface, the fourth surface, the fifth surface and the sixth surface of the light guiding component.

In this embodiment, the backlight module 1A does not require any additional bracket for mounting the light emitting component 12A, so that the backlight module 1A has a significantly reduced thickness. Besides, the light density of the light guiding component 13A of the backlight module 1A can be effectively increased. Therefore, the present invention has advantages of not only thin structure but also improved luminance.

Figure 6:
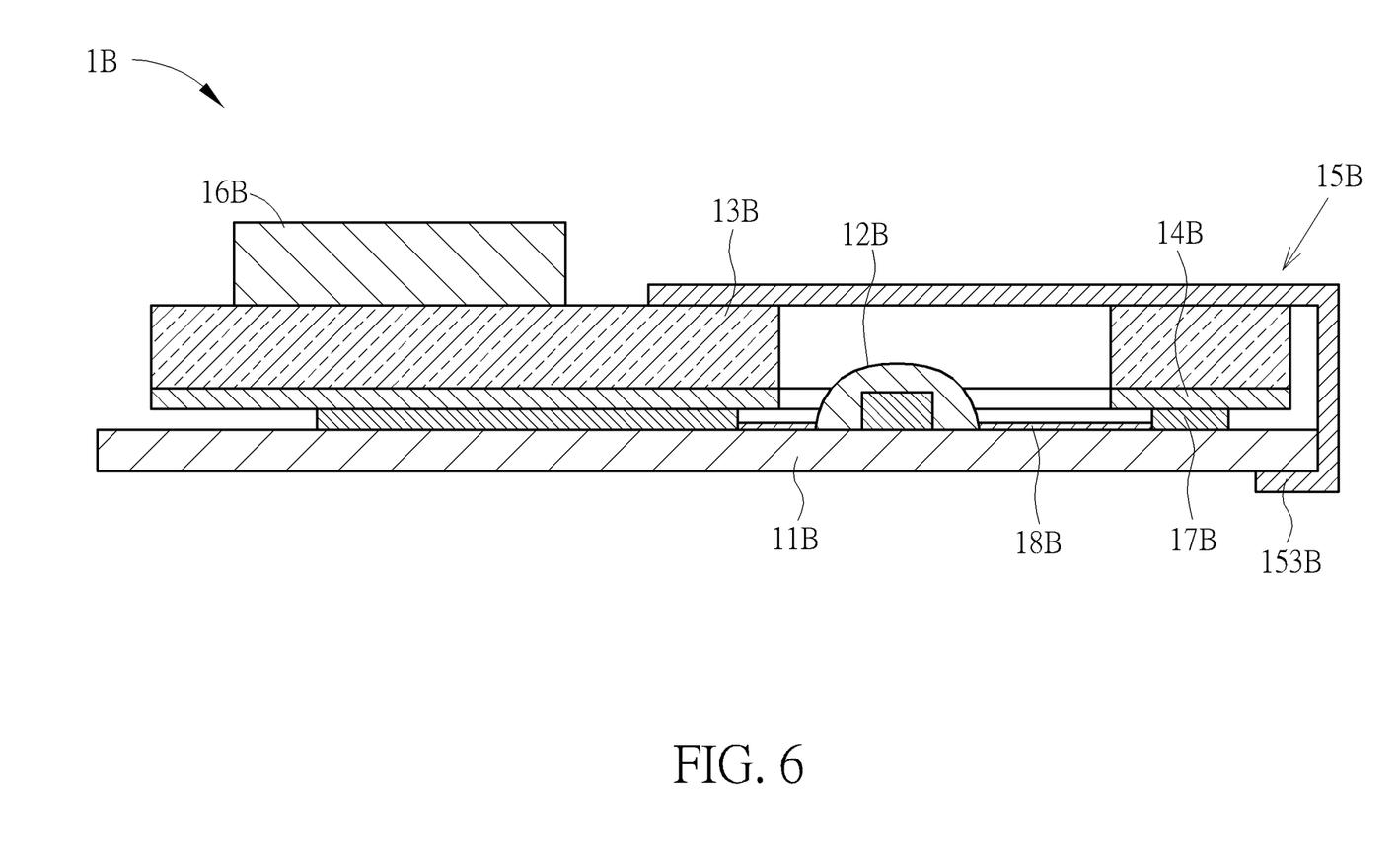
FIG. 6 is a partial sectional diagram of a backlight module according to a second embodiment of the present invention.
Figure 7:
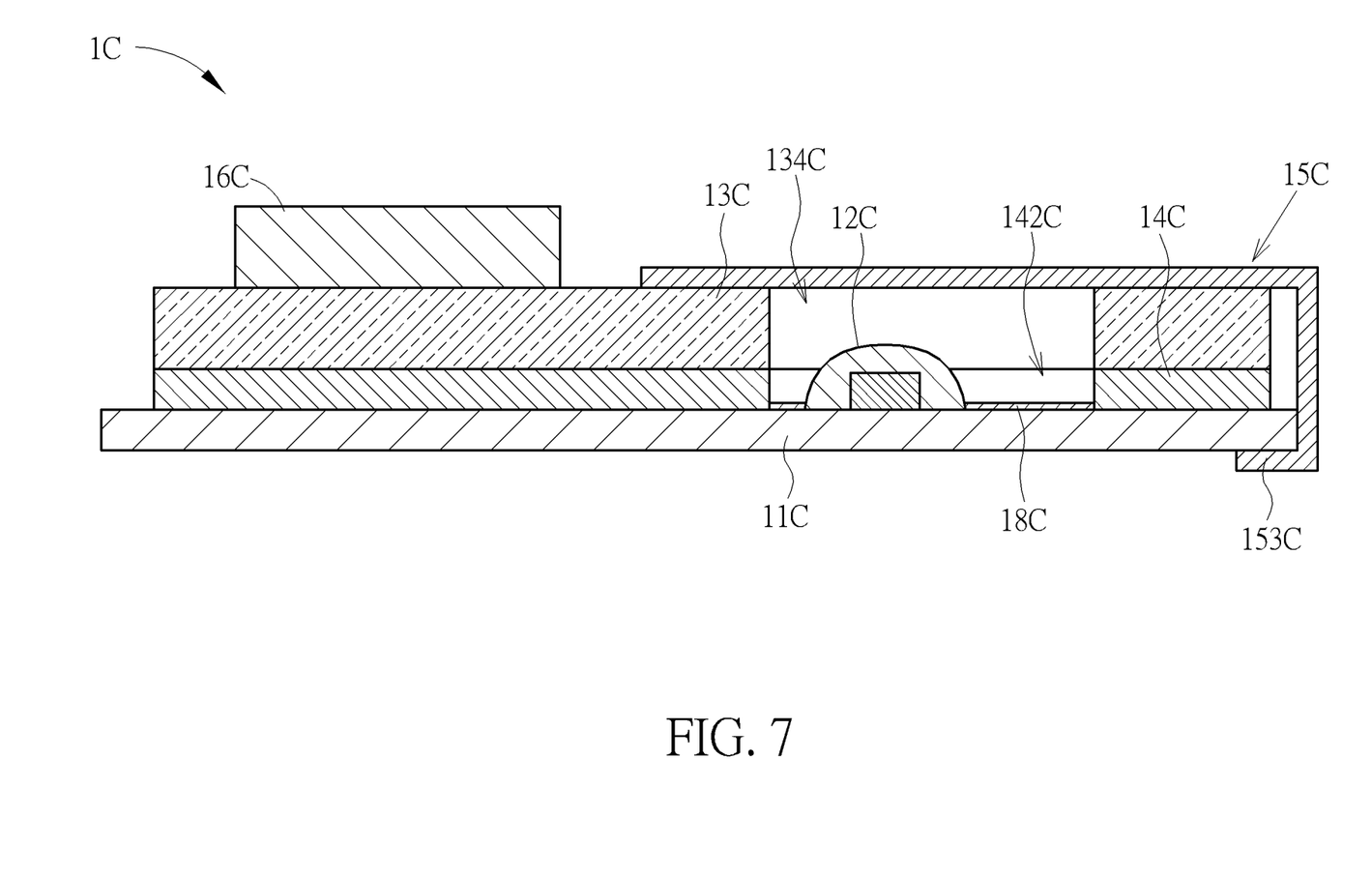
FIG. 7 is a partial sectional diagram of a backlight module according to a third embodiment of the present invention.
Figure 8:
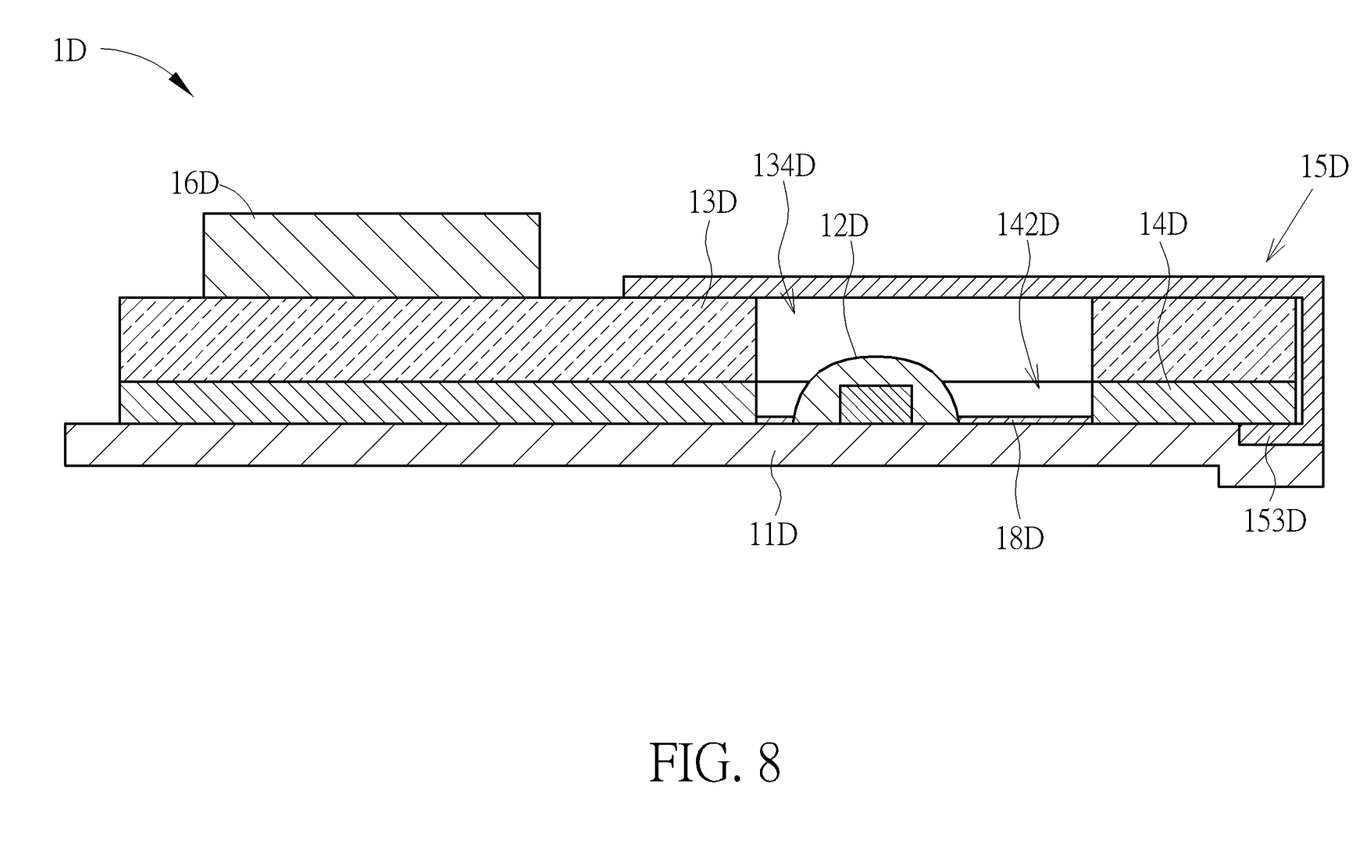
FIG. 8 is a partial sectional diagram of a backlight module according to a fourth embodiment of the present invention.
Figure 9:
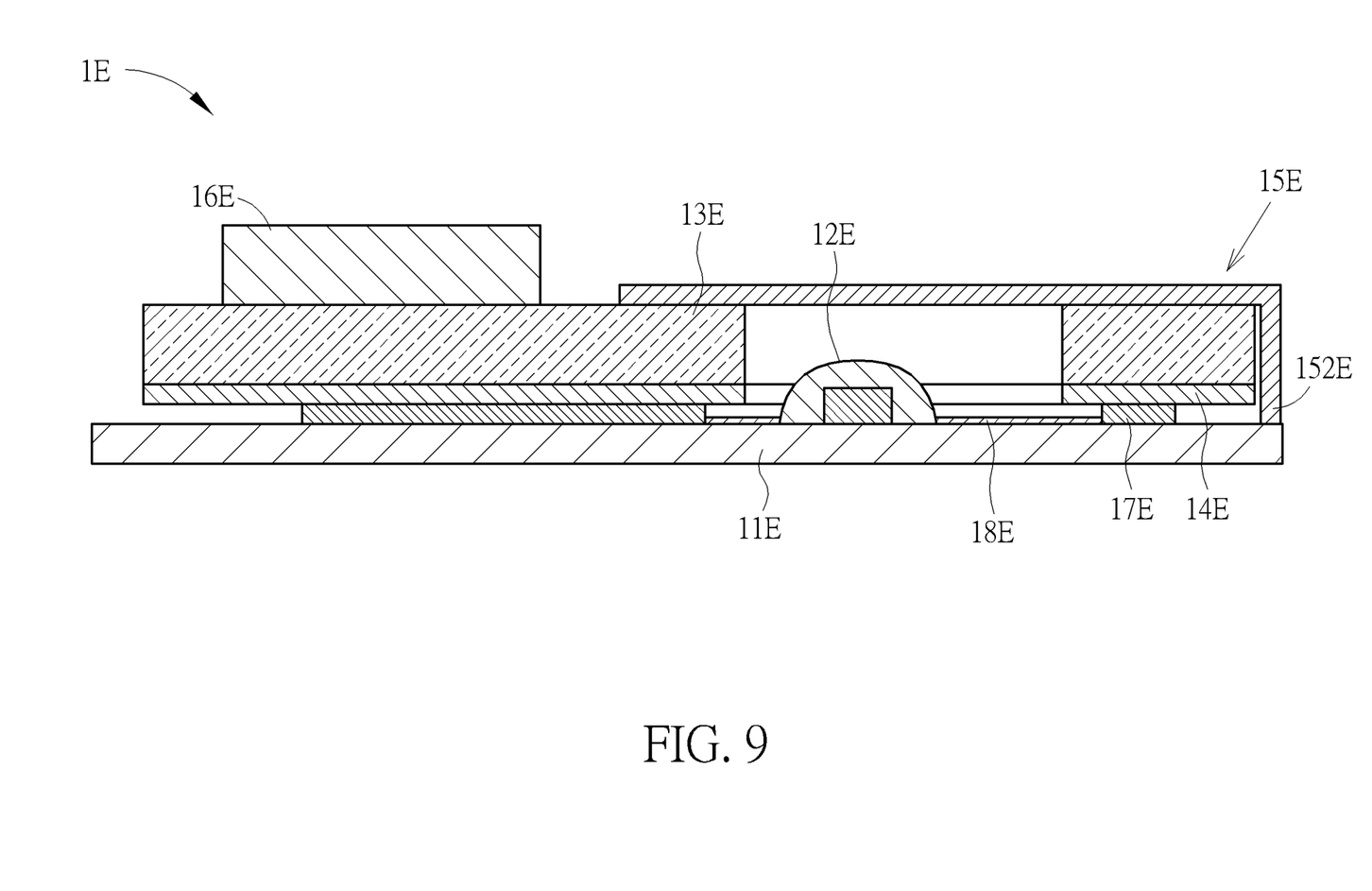
FIG. 9 is a partial sectional diagram of a backlight module according to a fifth embodiment of the present invention.
Figure 10:
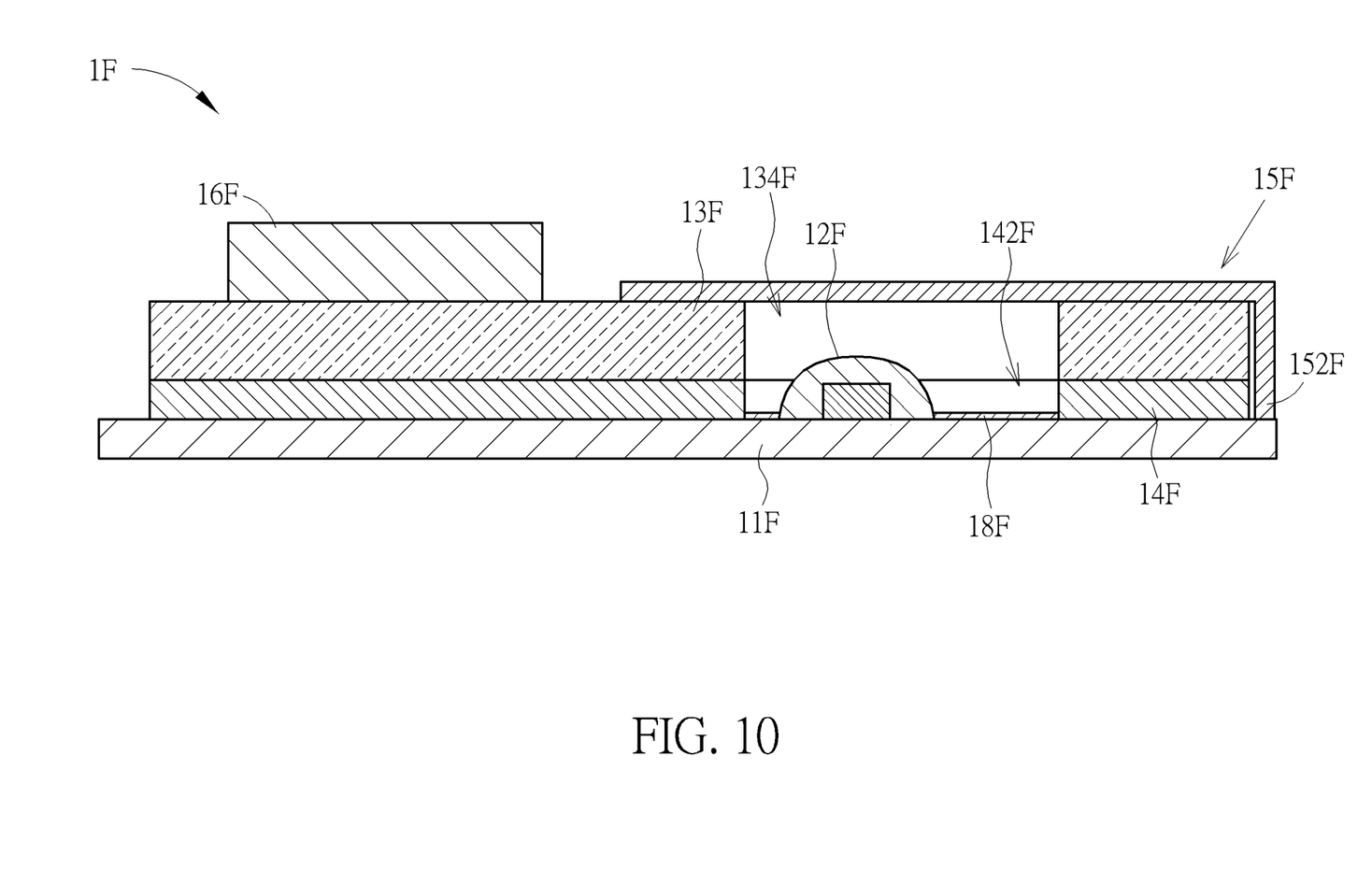
FIG. 10 is a partial sectional diagram of a backlight module according to a sixth embodiment of the present invention.

As mentioned above, the structure of the backlight module is not limited to the first embodiment. Further embodiments are provided as follows. Please refer to FIG. 6 to FIG. 10. FIG. 6 is a partial sectional diagram of a backlight module 1B according to a second embodiment of the present invention. FIG. 7 is a partial sectional diagram of a backlight module 1C according to a third embodiment of the present invention. FIG. 8 is a partial sectional diagram of a backlight module 1D according to a fourth embodiment of the present invention. FIG. 9 is a partial sectional diagram of a backlight module 1E according to a fifth embodiment of the present invention. FIG. 10 is a partial sectional diagram of a backlight module 1F according to a sixth embodiment of the present invention. As shown in FIG. 6, the backlight module 1B includes a circuit board 11B, a light emitting component 12B, a light guiding component 13B, a first light reflecting component 14B, a second light reflecting component 15B, a light transmissible component 16B, a combining component 17B and a light reflecting layer 18B. Different from the first embodiment, a third light reflecting portion 153B of the second light reflecting component 15B is located at a side of the circuit board 11B away from the first light reflecting component 14B. Other details of this embodiment are similar to the ones of the first embodiment. Detailed description is omitted herein for simplicity.

As shown in FIG. 7, the backlight module 1C includes a circuit board 11C, a light emitting component 12C, a light guiding component 13C, a first light reflecting component 14C, a second light reflecting component 15C, a light transmissible component 16C and a light reflecting layer 18C. Different from the first embodiment, a third light reflecting portion 153C of the second light reflecting component 15C is located at a side of the circuit board 11C away from the first light reflecting component 14C. The backlight module 1C does not include any combining component. A first opening 142C and a second opening 134C are respectively formed on the first light reflecting component 14C and the light guiding component 13C. The light emitting component 12C is accommodated inside an accommodating area or an accommodating space formed by the first opening 142C and the second opening 134C. Other details of this embodiment are similar to the ones of the first embodiment. Detailed description is omitted herein for simplicity.

As shown in FIG. 8, the backlight module 1D includes a circuit board 11D, a light emitting component 12D, a light guiding component 13D, a first light reflecting component 14D, a second light reflecting component 15D, a light transmissible component 16D and a light reflecting layer 18D. Different from the first embodiment, the backlight module 1D does not include any combining component. A first opening 142D and a second opening 134D are respectively formed on the first light reflecting component 14D and the light guiding component 13D. The light emitting component 12D is accommodated inside an accommodating area or an accommodating space formed by the first opening 142D and the second opening 134D. A portion of the circuit board 11D adjacent to a third light reflecting portion 153D of the second light reflecting component 15D is bendable or deformable, so as to position the third light reflecting portion 153D between the circuit board 11D and the first light reflecting component 14D. Other details of this embodiment are similar to the ones of the first embodiment. Detailed description is omitted herein for simplicity.

As shown in FIG. 9, the backlight module 1E includes a circuit board 11E, a light emitting component 12E, a light guiding component 13E, a first light reflecting component 14E, a second light reflecting component 15E, a light transmissible component 16E, a combining component 17E and a light reflecting layer 18E. Different from the first embodiment, the second light reflecting component 15E does not include any third light reflecting portion. A second light reflecting portion 152E of the second light reflecting component 15E is attached to, e.g., adhered to, a side of the circuit board 11E whereon the light emitting component 12E is disposed. Other details of this embodiment are similar to the ones of the first embodiment. Detailed description is omitted herein for simplicity. Understandably, in another embodiment, the second light reflecting portion of the second light reflecting component can be attached to, e.g., adhered to, a lateral side of the circuit board.

As shown in FIG. 10, the backlight module 1F includes a circuit board 11F, a light emitting component 12F, a light guiding component 13F, a first light reflecting component 14F, a second light reflecting component 15F, a light transmissible component 16F and a light reflecting layer 18F. Different from the first embodiment, the second light reflecting component 15F does not include any third light reflecting portion, and the backlight module 1F does not include any combining component. A first opening 142F and a second opening 134F are respectively formed on the first light reflecting component 14F and the light guiding component 13F. The light emitting component 12F is accommodated inside an accommodating area or an accommodating space formed by the first opening 142F and the second opening 134F. A second light reflecting portion 152F of the second light reflecting component 15F is attached to, e.g., adhered to a side of the circuit board 11F whereon the light emitting component 12F is disposed. Other details of this embodiment are similar to the ones of the first embodiment. Detailed description is omitted herein for simplicity. Understandably, in another embodiment, the second light reflecting portion of the second light reflecting component can be attached to, e.g., adhered to a lateral side of the circuit board.

It should be noticed that the aforementioned backlight module can be used to light up the pattern on the top casing of the laptop computer or a character, a symbol or a number on a key switch of a keyboard of the laptop computer, or can be used as a light source of a display of the laptop.

In contrast to the prior art, the present invention does not require any additional bracket for mounting the light emitting component, so that the present invention has a significantly reduced thickness. Besides, the present invention can effectively increase a light density of the light guiding component. Therefore, the present invention has advantages of not only thin structure but also improved luminance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module comprising:
   a circuit board;
   a light emitting component disposed on the circuit board;
   a light guiding component having a first surface, a second surface and a third surface, the second surface being farther away from the circuit board than the first surface;
   a first light reflecting component covering at least a portion of the first surface of the light guiding component; and
   a second light reflecting component comprising:
      a first light reflecting portion extending along a first direction, the first light reflecting portion covering at least a portion of the second surface of the light guiding component; and
      a second light reflecting portion connected to the first light reflecting portion, the second light reflecting portion extending along a second direction different from the first direction, the second light reflecting portion being located corresponding to the third surface of the light guiding component;
      wherein a first opening is formed on the first light reflecting component, a second opening is formed on the light guiding component, an accommodating area or an accommodating space is formed at least by the first opening and the second opening cooperatively, and the light emitting component is accommodated inside the accommodating area or the accommodating space.

2. The backlight module of claim 1, wherein the second light reflecting component further comprises a third light reflecting portion connected to the second light reflecting portion, and the third light reflecting portion extends along the first direction.

3. The backlight module of claim 2, wherein the third light reflecting portion is located between the first light reflecting component and the circuit board, or the third light reflecting portion is located at a side of the circuit board away from the first light reflecting component.

4. The backlight module of claim 1, further comprising a combining component located between the first light reflecting component and the circuit board.

5. The backlight module of claim 4, wherein the second light reflecting component further comprises a third light reflecting portion connected to the second light reflecting portion, and the third light reflecting portion extends along the first direction.

6. The backlight module of claim 5, wherein the third light reflecting portion is located between the first light reflecting component and the circuit board, or the third light reflecting portion is located at a side of the circuit board away from the first light reflecting component.

7. The backlight module of claim 1, wherein the first opening is located corresponding to the light emitting component.

8. The backlight module of claim 7, the second opening is located corresponding to the light emitting component.

9. The backlight module of claim 8, wherein the first light reflecting portion covers the second opening.

10. The backlight module of claim 8, further comprising a combining component located between the first light reflecting component and the circuit board, a third opening being formed on the combining component, and the third opening being located corresponding to the light emitting component.

11. The backlight module of claim 10, wherein the first light reflecting portion covers the second opening.

12. The backlight module of claim 7, further comprising a combining component located between the first light reflecting component and the circuit board, a third opening being formed on the combining component, and the third opening being located corresponding to the light emitting component.

13. The backlight module of claim 1, further comprising a light transmissible component disposed on the light guiding component.

14. The backlight module of claim 13, wherein an aperture is formed on the first light reflecting portion, and the aperture is located corresponding to the light transmissible component.

15. The backlight module of claim 13, wherein the light transmissible component is not aligned with the light emitting component along the second direction.

16. The backlight module of claim 1, further comprising a light reflecting layer formed on a surface of the circuit board, and the light emitting component being disposed on the surface of the circuit board.

17. The backlight module of claim 1, wherein the second light reflecting portion is located corresponding to the third surface of the light guiding component and a surface of the first light reflecting component.

18. A light emitting electronic device comprising:
   a casing; and
   a backlight module disposed on the casing, the backlight module comprising:
      a circuit board;
      a light emitting component disposed on the circuit board;
      a light guiding component having a first surface, a second surface and a third surface, the second surface being farther away from the circuit board than the first surface;
      a first light reflecting component covering at least a portion of the first surface of the light guiding component; and
      a second light reflecting component comprising:
         a first light reflecting portion extending along a first direction, the first light reflecting portion covering at least a portion of the second surface of the light guiding component; and
         a second light reflecting portion connected to the first light reflecting portion, the second light reflecting portion extending along a second direction different from the first direction, the second light reflecting portion being located corresponding to the third surface of the light guiding component;
         wherein a first opening is formed on the first light reflecting component, a second opening is formed on the light guiding component, an accommodating area or an accommodating space is formed at least by the first opening and the second opening cooperatively, and the light emitting component is accommodated inside the accommodating area or the accommodating space.

19. The light emitting electronic device of claim 18, wherein the light emitting electronic device is a laptop computer, and the casing is a top cover of the laptop computer.

20. The light emitting electronic device of claim 18, wherein the second light reflecting component further comprises a third light reflecting portion connected to the second light reflecting portion, the third light reflecting portion extends along the first direction, the third light reflecting portion is located between the first light reflecting component and the circuit board, or the third light reflecting portion is located at a side of the circuit board away from the first light reflecting component.

\* \* \* \* \*